United States Patent [19]
Koskinen et al.

[11] Patent Number: 5,616,662
[45] Date of Patent: Apr. 1, 1997

[54] METHOD FOR POLYMERIZING OLEFINS IN A FLUID-BED REACTOR

[75] Inventors: Jukka Koskinen, Espoo; Henrik Andtsjö, Porvoo, both of Finland; Jouni Takakarhu, Lyngby, Denmark; Kari Sarantila, Porvoo, Finland

[73] Assignee: Borealis Polymers Oy, Porvoo, Finland

[21] Appl. No.: 578,642

[22] PCT Filed: Jul. 1, 1994

[86] PCT No.: PCT/FI94/00304

§ 371 Date: Jan. 4, 1996

§ 102(e) Date: Jan. 4, 1996

[87] PCT Pub. No.: WO95/01831

PCT Pub. Date: Jan. 19, 1995

[30] Foreign Application Priority Data

Jul. 5, 1993 [FI] Finland .................................. 933073

[51] Int. Cl.$^6$ ...................................................... C08F 2/34
[52] U.S. Cl. ............................................. 526/88; 526/901
[58] Field of Search ........................................ 526/88, 901

[56] References Cited

U.S. PATENT DOCUMENTS

| | | | |
|---|---|---|---|
| 4,188,132 | 2/1980 | Lenart et al. | 366/314 |
| 4,366,123 | 12/1982 | Kato et al. | 422/135 |

FOREIGN PATENT DOCUMENTS

| | | |
|---|---|---|
| 692509 | 3/1971 | Finland . |
| 55123 | 10/1973 | Finland . |
| 55451 | 3/1975 | Finland . |

*Primary Examiner*—Thomas R. Weber
*Attorney, Agent, or Firm*—Steinberg, Raskin & Davidson, P.C.

[57] ABSTRACT

A fluidized bed polymerization process in which a central mixing element sweeps the interior of the bed. The mixing element contains agitator arm which pass adjacent to the reactor walls and a have a perforated surface. Gas is directed to the central mixing shaft and distributed to the agitator arms.

4 Claims, 1 Drawing Sheet

METHOD FOR POLYMERIZING OLEFINS IN A FLUID-BED REACTOR

The invention relates to a method of polymerizing and copolymerizing olefins in a fluidized-bed reactor suited for the polymerization of olefins in gas phase and equipped with a stirrer.

Gas-phase polymerization of olefins is conventionally performed in a fluidized bed, where the polymerization reaction occurs in a bed comprised of particles formed during polymerization. The heat generated in the polymerization is removed by circulating through the reactor and the fluidized bed such a circulating gas that, besides the monomers to be polymerized, also frequently contains hydrogen, inert diluents or inert gases. The circulating gas is cooled in a cooler placed outside the reactor and is then passed back to the lower part of the reactor. The circulating gas rising through the reactor keeps the fluidized bed in fluidized state maintaining efficient stirring in the bed. The larger the reactor, the more difficult it is to maintain homogeneous fluidization and stirring throughout the entire volume of the fluidized bed. In fact, it has been found that particularly the lower corners of the reaction space may contain zones with insufficient fluidization and stirring, which causes inferior heat transfer. This in turn may cause local overheating, whereby the temperature of the polymer particles reaches the softening point thus initiating the growth of adhering agglomerated clumps which then stick to the reactor walls. When such agglomerated polymer clumps later detach from the reactor walls, they deteriorate the quality of the product.

Remedy to the above-described problem in fluidized-bed reactors has been attempted through complementing the reactor with different types of mechanical agitator elements which augment the stirring action. A typical agitator device used is an anchor agitator having a pair or greater number of support arms attached to a vertical drive shaft with rite ends of the arms carrying vertically aligned agitator blades at equal distances from the vertical drive shaft. A disadvantage of such a stirrer is that the polymer particles driven by the centrifugal force imposed by the stirrer tend to travel toward the inner walls of the reactor. Consequently, agglomerated polymer clumps begin to adhere to the reactor walls. If the agitator arms are relatively short, a vortex is simultaneously induced in the center zone of the reactor, whereby the circulating gas introduced to the lower part of the reactor preferentially seeks toward this vortex zone. A solution to this problem has been attempted through providing the stirrer with a number of agitator arms of different lengths.

U.S. Pat. No. 4,366,123 discloses an anchor agitator with the main agitator arms designed so long that the agitator blades attached to the ends of the arms move very close to the vertical inner wall of the reactor. Additionally, the agitator has shorter agitator arms carrying agitator blades that move closer to the drive shaft. Furthermore, at least the main agitator blades have a triangular cross section. This design aims at achieving a sufficient stirring efficiency and avoiding vibration effects induced by the rotational movement of the agitator.

U.S. Pat. No. 4,188,132 discloses a spiral stirrer of a fluidized bed reactor comprising the stirrer attached to the end of a drive shaft only at the lower pan of the spiral stirrer which at its lower end over the length of the first turn of the spiral is provided with a separate distributor spiral element. Fresh gas acting as a cooling medium is introduced to the reactor via an inlet channel of the drive shaft. The purpose of said distribution spiral element is to reverse the direction of the gas flow entering the reactor and thus prevent the formation of agglomerated clumps on the bottom of the reactor.

However, the above-cited US patents fail to cure the insufficient fluidization at the reactor corners and inner walls and the adherence of the polymer particles to the inner walls of the reactor, which typically occur in large-diameter reactors. The present invention is especially related to the elimination of these problem.

The method according to the present invention achieves simultaneously both an efficient stirring action and improvement of fluidization in the critical zones and prevention of polymer particle adherence to the reactor inner surfaces. Hence, the invention is related to a method of polymerizing olefins in a fluidized-bed polymerization reactor in which olefin monomers are polymerized in a fluidized bed formed by polymerizing particles containing the polymerization catalyst, said fluidized bed being maintained in fluidized state by introducing to the reactor at least one circulating gas flow containing polymerizable monomers and optionally hydrogen, inert gases or a diluent gas, and said fluidized bed being stirred by virtue of at least one stirring means which is attached to an essentially vertical drive shaft and is suited for stirring a fluidized bed. The method according to the invention is characterized in that at least a portion of the gas flow introduced to the reactor is passed to the reactor via at least one flow channel provided to the inside of said shaft and said agitator means.

Accordingly, in the method according to the invention is employed a flow channel via which a gaseous medium can be passed at a high velocity directly to such reactor vessel zones where the action of the conventional fluidizing gas flow is weakest. In this fashion a flushing action is achieved that significantly reduces the agglomeration and adherence of polymer particles to the lower edge and inner walls of the reactor vessel bottom part.

According to a preferred embodiment of the invention, the stirrer drive shaft, agitator arms attached to said mixer drive shaft and agitator blades connected to said arms are hollow and form a continuous flow channel via which the stirring gas can be introduced to the reactor through holes of the agitator blades. The gas ejected from the holes flushes the reactor walls and improves the fluidization and the stirring of the particles contained in the bed, simultaneously improving cooling in such zones where overheating otherwise occurs readily.

The agitator blades are advantageously, whilst not necessarily, upward vertically extending paddles connected to the agitator arms attached to the drive shaft of the stirrer. The agitator arms are advantageously, whilst not necessarily, horizontally extending arms with a freely selectable cross section. However, as a rule the cross section of the arms is designed for minimum agitation resistance. The length of the agitator arms is advantageously designed such that permits the agitator blades connected to the ends of the agitator arms to extend as close as possible to the inner walls of the reactor vessel where the fluidization action is inherently weakest.

According to an embodiment of the invention, the stirrer may include at least one auxiliary arm with agitator blades, whereby the length of the auxiliary arm may be shorter than that of the main agitator arm. Also here the auxiliary arm and the agitator blades attached thereto may be hollow so as to form a flow channel for the introduction of the stirring gas to the reactor. Typically, a pair of auxiliary arms is sufficient to achieve a satisfactory stirring effect.

The gaseous medium passed via the stirrer can be any of the gases normally introduced to the reactor. Accordingly, the desired action can be attained by using the monomer or comonomer feedstock, hydrogen, an inert gas or inert gaseous diluents in combination or separately as the stirring gas. The stirring gas flow passed via the stirrer may also comprise a side stream taken from the circulating gas flow passed through the reactor. Since the circulating gas may, however, contain fine polymer particles escaped via the reactor top, the stirring gas passed via the stirrer is advantageously a catalyst- and polymer-free gas formed by, e.g., an inert medium, monomers or mixtures thereof.

The proportion of the gaseous medium passed via the stirrer can be varied in the range of 0.1–30 wt-%. The actual proportion of the stirring gas sufficient for attaining a satisfactory flushing effect may, however, be selected appreciably lower than the upper limit given above, whereby the amount of the stirring gas typically is 0.1–10 wt-%, advantageously 0.3–5 wt-%, of the total gas flow introduced to the reactor. Given the volumes of industrial-scale fluidized-bed reactors, cited proportions correspond to stirring gas flows of several tons per hour.

A polymerization reactor equipped with a stirrer according to the invention can be used for gas-phase fluidized-bed polymerization or copolymerization of any polymerizable monomer. Suitable monomers are, e.g., olefins such as ethene, propene, butene, pentenes, hexenes, etc., and any other monomers.

BRIEF DESCRIPTION OF THE DRAWINGS

The invention is next examined with reference to annexed drawings in which:

With reference to FIG. 1, the fluidized-bed reactor is denoted by a general reference numeral 10. The reactor vessel has a cylindrical outer wall 11. A perforated gas distribution plate 12 divides the reactor 10 into an infeed portion 13 of the circulating gas and a fluidized-bed portion 14. The bottom part of the reactor 10 is comprised of two concentrical conical surfaces of revolution of which the inner conical wall surface 15 is tapered upward and the outer conical wall surface 16 is tapered downward. The conical surfaces 15 and 16 are joined to each other by a smooth annular section 17 which forms the lowermost part of the reactor vessel bottom. The wall section formed by the inner conical surface 15 is shaped at its upper rim into a horizontal support plane 24.

Figure 1:
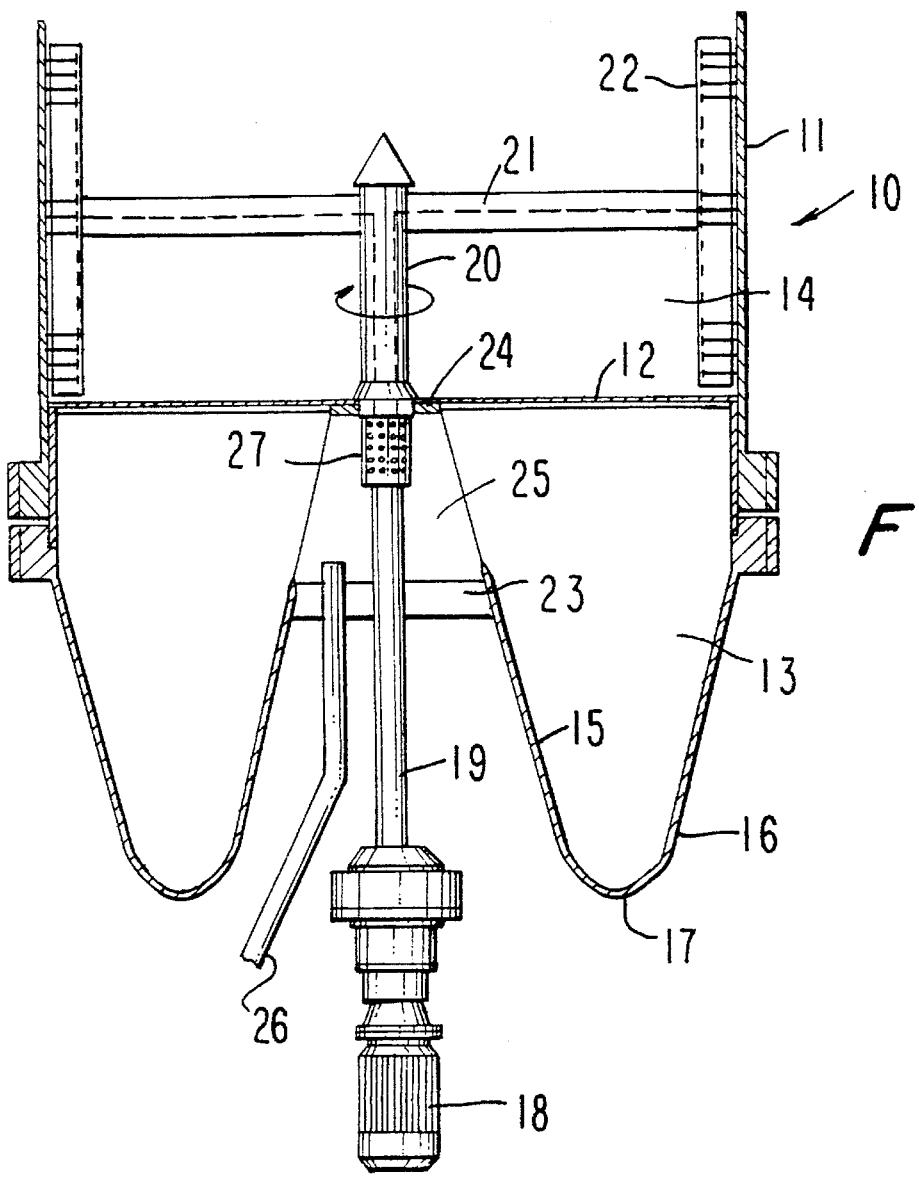
FIG. 1 is a sectional side view of the bottom of a fluidized-bed reactor equipped with a stirrer designed to implement the method according to the invention.

The circulating gas flow is passed to the infeed portion 13 of the reactor 10 via at least one circulating gas pipe (not shown) and further via the gas sparger plate 12 to the fluidized-bed portion 14.

According to the invention, the stirrer comprises an electric motor 18 rotating a vertical connecting shaft 19 which further extends into the reactor as a stirrer drive shaft 20 having agitator arms 21 attached to it with agitator blades 22 connected to the arm ends. The electric motor 18 with its bearings for rotating the stirrer drive shaft 20 is advantageously sited within or under the bell-shaped recess formed by the inner conical wall surface 15 of the reactor bottom. The shaft 19 is advantageously taken by means of a rotary seal through a horizontal auxiliary wall 23, whereby the auxiliary wall 23, the inner conical wall surface 15 and the horizontal support plane 24 together enclose an infeed chamber 25 for the feed of the stirring gas. By mounting the shaft 19 and the stirrer drive shaft 20 in bearings on the auxiliary wall 23 and the horizontal support plane 24, a rigid support is advantageously provided for the shafts, and by the same token, the gas sparger plate 12 can be supported to the horizontal support plane 24.

The method according to the invention advantageously employs a stirrer having a hollow connecting shaft 20 through which gaseous or liquid substances can be passed. Similarly, the agitator arm 21 is made hollow and its hollow inner channel communicates with the hollow inner channel of the mixer drive shaft 20. Furthermore, the agitator blades 22 are made hollow and their hollow inner cavities are adapted to communicate with the inner hollow channel of the agitator arm 21. Hence, a continuous channel is formed extending from the stirrer drive shaft 20 to the agitator blades 22.

The gaseous medium is passed to the stirrer advantageously via a chamber 25. The gas is first passed via a pipe 26 to the chamber 25 and therefrom further via an optional strainer 27 into the hollow stirrer drive shaft 20. The gas pumped to the stirrer may comprise a side stream taken from the circulating gas flow passed to the bottom part of the reactor 10, whilst more advantageously the stirring gas is fresh catalyst- and polymer-free gas such as a monomer, comonomer, hydrogen or an inert medium.

Figure 2:
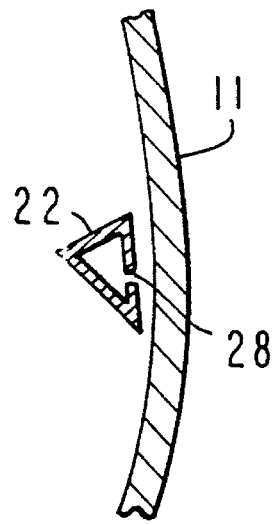
FIG. 2 is cross-sectional view of a agitator blade of a stirrer according to the invention.

With reference to FIG. 2, the agitator blades 22 are provided with flow openings 27 via which the stirring gases can be introduced to the reactor 10. The flow openings 27 may comprise, e.g., perforated holes which may be made to the entire length of the agitator blade 22, or alternatively, only over a portion thereof.

Whilst the method according to the invention is herein described applied to the use of a combination of horizontal agitator arms with vertically aligned agitator blades, the stirrer may equally well comprise a spirally-shaped hollow agitator element in which the outer edge of the spiral is provided with perforation for ejecting the stirring gas.

We claim:

1. A method of polymerizing olefins in a fluidized-bed polymerization reactor in which olefin monomers are polymerized in a fluidized bed formed by polymerizing particles containing the polymerization catalyst, said fluidized bed being maintained in fluidized state by introducing to the reactor (10) at least one gas flow containing polymerizable monomers and optionally hydrogen, inert gases or a diluent gas, and said fluidized bed being stirred by virtue of at least one agitator means (21,22), which is attached to an essentially vertical drive shaft (19,20) and is suited for stirring a fluidized bed, characterized in that at least a portion of the gas flow is lead into the reactor (10) close to the inner walls of the reactor via at least one flow channel provided to the interior of said shaft (20) and said agitator means (21,22) and extending to reach close to the reactor wall.

2. A method as defined in claim 1, characterized in that said portion of the gas flow in passed to the reactor (10) via at least one horizontal agitator arm (21) and agitator blades (22) attached to the end thereof, said blades (22) being adapted to reach close to the reactor wall (11).

3. A method as defined in foregoing claims 1, characterized in that said portion of the gas flow is passed to the reactor (10) via ejection holes (28) drilled to said blades (22).

4. A method as defined in any of foregoing claims 1, characterized in that said agitator means includes a spiral-shaped agitator element attached to said shaft (19), said element incorporating said flow channel and being perforated to the end of ejecting gas to the reactor (10) during stirring.

* * * * *